United States Patent [19]

Erb et al.

[11] Patent Number: 4,999,067
[45] Date of Patent: Mar. 12, 1991

[54] METHOD FOR MAKING A HERMAPHRODITE HOOK AND LOOP FASTENERS

[75] Inventors: George H. Erb, Cuttingsville; Susan E. Beard, Rutland, both of Vt.

[73] Assignee: Erblok Associates, Charlottesville, Va.

[21] Appl. No.: 310,522

[22] Filed: Feb. 13, 1989

[51] Int. Cl.⁵ ............... B29C 47/00; A44B 17/00; A44B 18/00
[52] U.S. Cl. .................. 156/73.1; 156/66; 156/242; 156/244.11; 156/244.25; 156/244.22; 264/166; 264/177.1; 264/177.16; 264/177.17; 264/263; 24/444; 428/100
[58] Field of Search ............... 156/66, 73.1, 73.4, 156/242, 244.11, 244.25, 244.22; 428/100; 24/444, 445, 446, 306, 450, 442; 264/166, 177.1, 177.16, 177.17, 243, 263

[56] References Cited

U.S. PATENT DOCUMENTS

| 3,130,111 | 4/1964 | Izumi | 428/100 X |
| 3,147,528 | 9/1964 | Erb | 428/100 X |
| 3,562,770 | 2/1971 | Erb | 24/446 |
| 3,695,976 | 10/1972 | Erb | 24/446 X |
| 3,758,657 | 9/1973 | Menzin | 264/166 |
| 4,001,366 | 1/1977 | Brumlik | 264/177.1 X |
| 4,169,303 | 10/1979 | Lemelson | 428/100 X |
| 4,633,565 | 1/1987 | DeWoskin | 156/66 X |
| 4,794,028 | 12/1988 | Fischer | 428/100 |
| 4,881,997 | 11/1989 | Hatch | 156/66 |

FOREIGN PATENT DOCUMENTS

1166935 10/1969 United Kingdom ............... 24/446

Primary Examiner—Michael W. Ball
Assistant Examiner—Jeff H. Aftergut
Attorney, Agent, or Firm—Parmelee, Bollinger & Bramblett

[57] ABSTRACT

A method is provided for making a hermaphrodite hook and loop fastener including the steps of molding a hook ribbon having mounting projections and shoulders on opposite sides of the hook ribbon, providing a separate flexible substrate, feeding a plurality of hook ribbons to a bonding station, orienting the hook ribbons with their hooks upstanding from the substrate and their mounting projections facing the substrate at the bonding station, pushing the shoulders of the hook ribbon toward the substrate thereby thrusting the mounting projections onto the substrate, and ultrasonically bonding the mounting projections to the substrate.

16 Claims, 8 Drawing Sheets

METHOD FOR MAKING A HERMAPHRODITE HOOK AND LOOP FASTENERS

FIELD OF THE INVENTION

The present invention is in the field of hook and loop fasteners, and more particularly this invention relates to hermaphrodite (sometimes called "bi-functional") hook and loop fasteners and to the method and system for producing such fasteners.

BACKGROUND

One of the present inventors has previously invented hermaphrodite hook and loop fasteners as shown in U.S. Pat. Nos. 3,695,976 and 3,562,770. However, such prior fasteners were complex, three-level structures made from three prefabricated webs of hook-forming, mesh-forming and base sheet-forming materials, respectively.

By virtue of containing both hooks and loops, an hermaphrodite fastener gives the user flexibility in usage regarding various combinations of opposable, matable fastener media, because the hermaphrodite fastener can be mated with an opposed hermaphrodite fastener or with an opposed loop medium or with an opposed hook medium. There does not appear to be any commercially successful hermaphrodite hook and loop fastener on the market today.

SUMMARY OF THE DISCLOSURE

The hermaphrodite hook and loop fasteners comprise a hook-receptive female loop-bearing substrate in whose surface are mounted a plurality of rows of upstanding male hooks. These rows of upstanding hooks are oriented so that a very large proportion of the loops on the substrate remain undisturbed and exposed between the mounted rows of hooks and are available to provide strong attachment capability when mated with an opposed hook-bearing fastener.

The rows of upstanding hooks are initially formed by dynamically molding stiffly flexible thermoplastic material into continuous ribbons of hooks, called "hook-ribbons". To mold these hook-ribbons, a pressurized melt source of heated thermoplastic material injects the melted material into a continuously moving mold comprising a plurality of revolving mold bands. The mold bands are temporarily held together in a layered configuration while they are travelling past an injection head of the pressurized melt source such that these layered mold bands define continuous, travelling mold cavities. Each continuous mold cavity is a sequence of hook-forming recesses extending along one margin and a sequence of welding-projection-forming recesses extending along the other margin.

After the hook-ribbons have been molded in these continuously moving cavities, the revolving mold bands are temporarily separated for removal of the molded hook-ribbons. Then, the revolving mold bands return to the injection head for continuing the dynamic molding. As a result of this dynamic molding procedure, the hook-ribbons have numerous hooks spaced along one margin and numerous welding projections spaced along the other margin. These projections serve to become anchored to the substrate during mounting of the hook-ribbons on the substrate. There are bosses located on opposite surfaces of the hook-ribbon, superimposed on these welding projections. These bosses act as driving surfaces for thrusting the projections against or onto a substrate and are used for momentarily holding the hook-ribbon in upright position while the portion of each anchoring projection contiguous with the substrate is ultrasonically softened, melted and fused with the substrate material and melded into pores of the substrate for anchoring the upstanding hooks. As mentioned near the beginning of this Summary, a very large proportion of the loops on the upperside of the substrate advantageously remain undisturbed and available between the resulting rows of hooks for providing strong attachment capability when mated with an opposing hook-bearing fastener.

Among the features and advantages of hermaphrodite hook and loop fasteners embodying the present invention are:

1. There is a strong engagement capability between hooks and loops because the heads and shanks of the hooks can be specifically designed and molded as desired so as to have superior characteristics. By virtue of the fact that these molded hooks have a rectangular cross-sectional shape they provide design flexibility and manipulative shape availability not provided by conventional filament hooks that result from the cutting of looped filaments, which have a round cross-sectional shape. Filament hooks have the same cross-sectional area from the tip of the hook to the base of the shank, whereas the present hooks with their rectangular cross section can be tapered and configured as may be desired for providing maximum hooking strength for resisting tension forces or shear forces exerted on the fastener tending to pull the hooks out of engagement with the loops.
2. The material forming the hook-ribbons can be different from the material forming the loop-bearing substrate, because of the fusing welding and/or mechanical interlocking action of the ultrasonically softened and melted anchoring projections.
3. Any stiffly flexible thermoplastic material of any color can be used to mold the hook-ribbons, which may be the same as or different from the substrate.
4. By virtue of using pre-colored material in the hook-ribbons and in the loop-pile substrate, the need for dyeing can largely be eliminated.
5. In addition to being designed and configured for strongest hooking results, the hooks can also be shaped for the best release results when this fastener is intentionally being released by peeling it from a mating loop-bearing medium.
6. These hermaphrodite hook and loop fasteners can effectively engage each other, with the rows of hooks on the mating fasteners being oriented in parallel, or at perpendiculars, or at any intermediate relationship. In other words, the relative orientation of the mating surfaces is not critical.
7. This hermaphrodite hook and loop fastener can mate with (i) an opposed hermaphrodite hook and loop fastener or with (ii) an opposed loop fastener medium or with (iii) an opposed hook fastener medium.

It is among the objectives of the present invention to provide hermaphrodite hook and loop fasteners which can be manufactured at considerably faster rates of production than current hook and loop fasteners heretofore.

BRIEF DESCRIPTION OF THE DRAWINGS

The foregoing and other aspects, objectives, features and advantages of the invention will become more fully understood from the following description of preferred embodiments of the invention, as illustrated in the accompanying drawings, in which like reference characters refer to like parts throughout the different views. The drawings are not necessarily to scale, emphasis instead being placed upon clearly illustrating the principles of the invention.

FIG. 2 is an enlarged cross-sectional view taken along the plane 2—2 in FIG. 1 through the injection head and the layered mold bands and showing the support means for these layered mold bands.

FIG. 8 is a plan view of a third type of mold band, indicated as band "C", which serves to interlock the pair of bands B with the six bands A sandwiched therebetween. FIG. 8 illustrates two phases in the manufacture of band C: the upper half of this drawing shows this band before the interlocking tabs have been bent upwardly and the lower half of this drawing shows the tabs in their upright position.

FIG. 8A is a partial section taken along line 8A—8A in FIG. 8 and shown considerably enlarged.

FIG. 11 is a partial cross-sectional view showing one of the upstanding interlocking drive tabs projecting up through aligned drive openings of two bands B with a band A sandwiched therebetween.

DETAILED DESCRIPTION OF PREFERRED EMBODIMENTS

Figure 1:
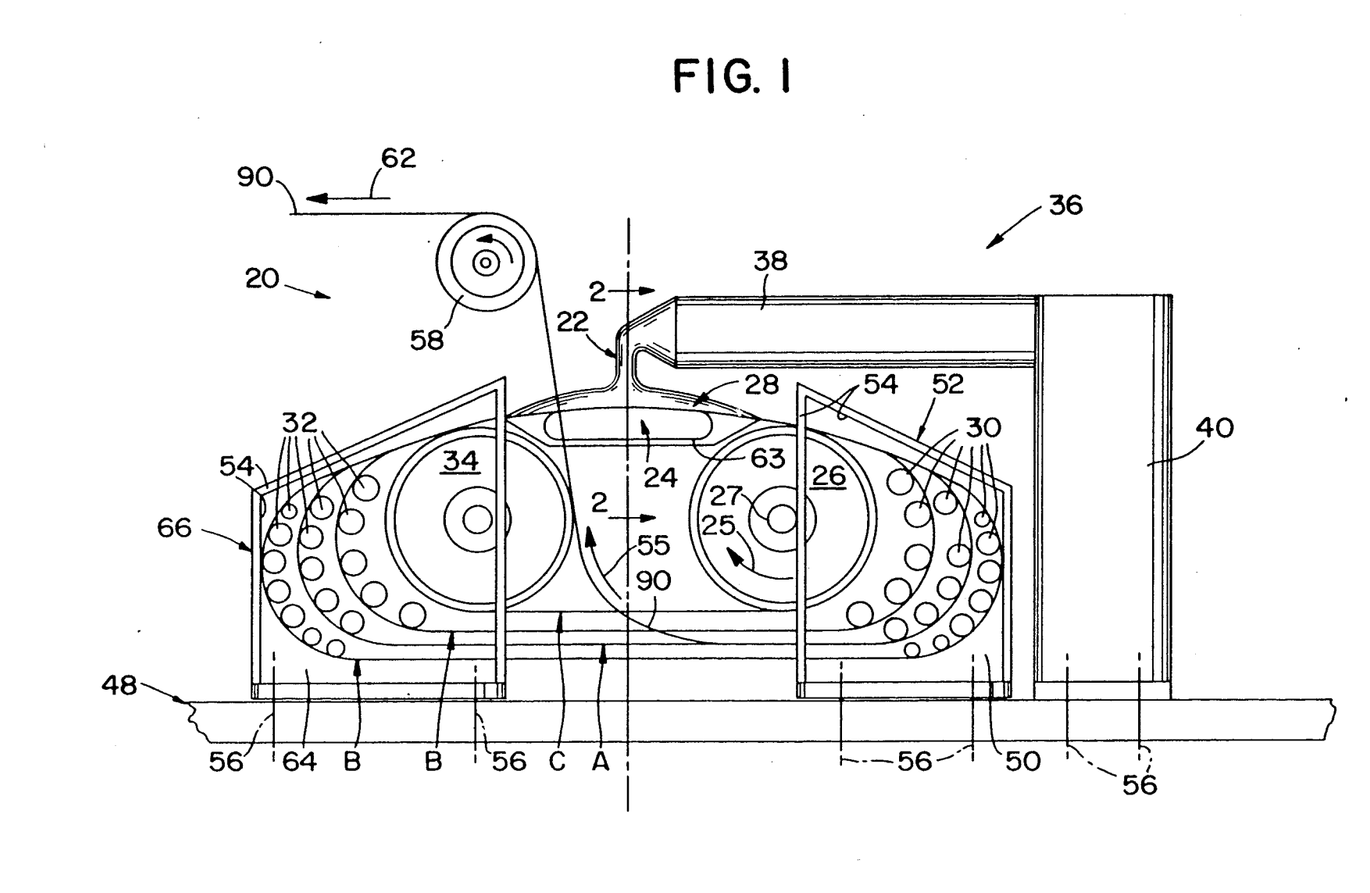
FIG. 1 is a side elevational view illustrating a dynamic molding method and system employing four layers of continuously revolving, stiffly flexible mold bands.

In the method and system as illustrated in FIG. 1, there is a dynamic, continuous mold 20 including multiple revolving endless, stiffly flexible bands, which are seen in edge view in FIG. 1. An inner band "C" serves as the driving and interlocking band. There is a pair of identical bands "B", which may be called upper and lower mold bands, which are positioned inside and outside, respectively, of a set of continuous-cavity-defining bands "A". In other words, these bands A are sandwiched between the bands B, as will be explained in detail later.

In order to define the dynamic continuous mold, these bands in a top-to-bottom relationship B-A-B-C are pulled in layered relationship between a crosshead injector 22 and a mold support 24. A sprocket drive wheel 26 is driven (arrow 25) by a controllable speed motor (not shown) through a speed-reducing gearbox (not shown) connected to the drive wheel axle 27 for pulling the layered bands through a narrow clearance gap 28 between the crosshead injector 22 and the mold support 24. After the bands have passed this drive wheel 26, they become separated and are individually guided by multiple guide rollers 30. In the lower part of this system, the mold bands A, B and C are travelling to the left as seen in FIG. 1. These revolving bands are individually guided by another set of multiple guide rollers 32, and then they become combined together in their layered relationship as they approach and travel past an idler wheel 34 in preparation for re-entering between the crosshead injector 22 and the mold support 24

For supplying melted thermoplastic material to the crosshead injector 22, there is a pressurized melt source 36, shown as an extruder, having a feed barrel 38 and a drive housing and base 40, thus feeding melted thermoplastic into the mold cavities defined by the mold bands A, B and C.

For cooling the injected heated thermoplastic material within the mold cavities, the mold bands A, B and C, after reaching the drive wheel 26, then enter a cooling chamber 50 enclosed by a housing 52 having a frame 54. The nearside panel of this housing 52 is shown removed from the frame 54 for more fully showing the whole of the mold bands and their individual guide rollers 30. The purpose of separating these mold bands is for enabling the finished hook-ribbons 90 (only one is seen) to be removed from this revolving mold, as indicated by the arrow 55. These finished hook-ribbons 90 pass over a pulley 58 and are led away, arrow 62, to be reeled up for temporary storage and shipment or to be used for completing hermaphrodite hook and loop fasteners, as will be explained later.

In order to reheat the revolving mold bands A, B and C after removal of the finished hook-ribbons 90, these bands enter a heating chamber 64 enclosed by a housing 66 having a frame 54, with the nearside panel of housing 66 being shown removed to illustrate the mold bands more clearly. Floor attachment mountings are indicated at 56 for the housings 52 and 66 and for the drive housing and base 40.

As shown in FIG. 2, the crosshead injector 22 includes a controllably heated casing 68 having an inlet passage 70 into which is fed pressurized melted thermoplastic material from the extruder 38 indicated by flow arrows 72. This inlet passage 70 communicates through a crosshead chamber 74 with a plurality of injection orifices 76 feeding down through a mold-mating surface 78 of the injector 22. It will be understood by those skilled in the art of injection molding that means are provided for causing uniform feed rates of the melted thermoplastic material through the respective injection orifices 76. For example, the injection orifices 76 nearer the inlet passage 70 can be appropriately configured so as to offer more impedance to flow 72 than the orifices 76 farther from the inlet passage 70.

The layered mold bands in their top-to-bottom relationship B-A-B-C are shown in cross section in the region 28 between the mold-mating surface 78 and the opposed support 24. The layered mold bands B-A-B-C in this region 28 are interlocked together as will be explained later and are travelling together at the same speed for defining a plurality of continuously moving, continuous mold cavities 80 having multiple inlet ports 82 uniformly spaced along the path of travel of the mold bands for molding hook-ribbons as described later. A pair of guideways 81 located on opposite sides of the support 24 keep the layered moving mold bands aligned with the injection orifices 76, while the support 24 firmly presses the layered mold bands in sliding relationship against the mold-mating surface 78.

It is to be noted that the uppermost band B defines multiple inlet ports 82. A respective inlet port 82, when it passes a respective injection orifice 76, serves to connect the orifice with a respective mold cavity 80 for injecting the melted thermoplastic material 72 into the mold cavity. There are clearance grooves 83 in the mold-mating surface 78 for providing clearance for interlocking or alignment tabs projecting up from the lowermost band C through openings in the other bands, as will be explained later (as shown in FIG. 11).

The support 24 includes a multiplicity of needle bearings 61 supporting the lowermost band C in rolling contact with the bottom surface of the lowermost band. These needle bearings 61 are travelling in an endless, oval track 63 (FIG. 1) including a lower return path 65 (FIG. 2). These needle bearings extend for the full width of the layered mold bands, and the ends of each needle bearing project beyond the opposite edges of the lowermost band C, being received in opposed guide channels 67. Thus, these needle bearings continuously recirculate around their endless track 63, guided by channels 67, as these bearings serve to support the layered mold bands B-A-B-C moving through the region 28 between the crosshead injector 22 and the support 24.

In order to apply pressure to the layered mold bands B-A-B-C in the region 28 for holding them firmly pressed together for defining the respective mold cavities 80 (FIG. 2) as the pressurized melted thermoplastic material 72 is being injected therein, there is a plurality of cylinder and piston units 69 mounted on a transverse frame 71 extending between the drive wheel 26 (FIG. 1) and the idler wheel 34. (This transverse frame 71 and the piston units 69 are omitted from FIG. 1 for clarity of illustration there of the mold bands.) Piston rods 73 extending up from the cylinder and piston units 69 exert a controllable upward force on the support 24. For controlling this upward force exerted by the piston rods 73, there is a controllable source 75 of pressurized fluid connected by conduit lines 77 and 79 to the cylinders respectively below and above the pistons therein for regulating piston up-thrust as desired.

Figures 3, 4:
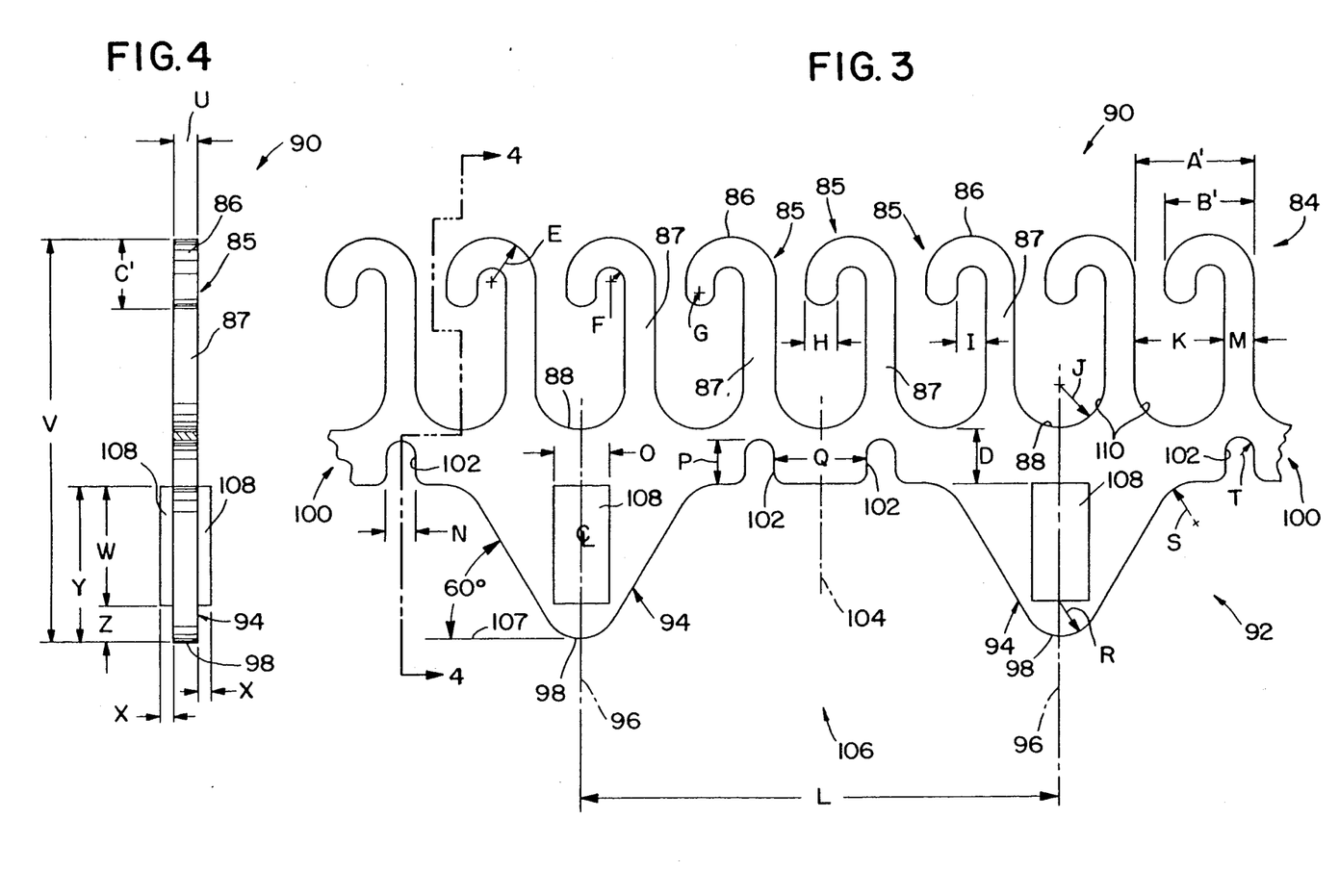
FIG. 3 is a greatly enlarged side elevational view of one of the thermoplastic hook-ribbons dynamically molded by the method and system of FIGS. 1 and 2.
FIG. 4 is a cross-section on the same scale as FIG. 3, being a section taken along the line 4—4 in FIG. 3.
Figure 5:
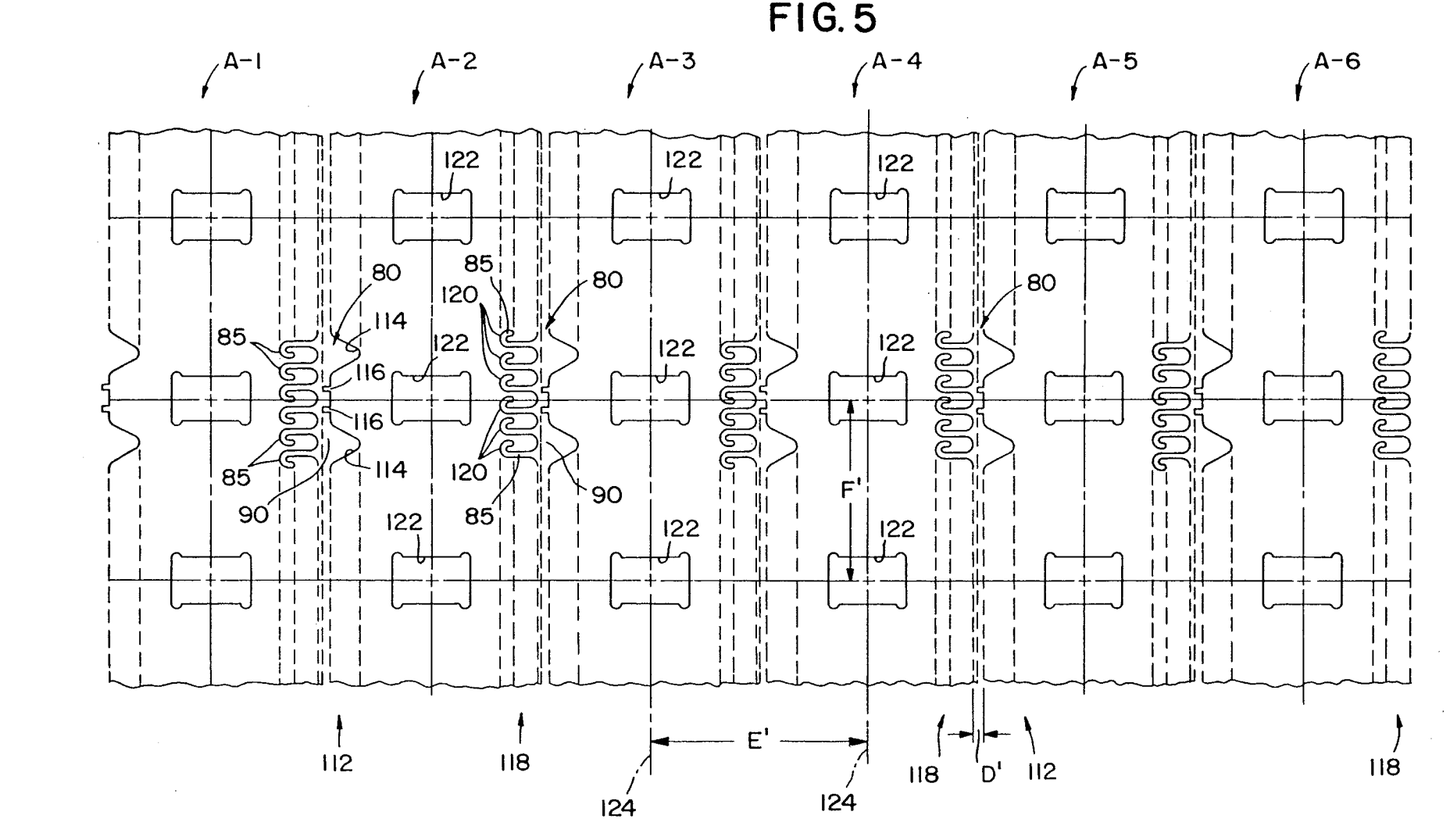
FIG. 5 is a plan view showing the five-continuous-cavity molding pattern produced by six identical mold bands arranged in margin-to-margin spaced parallel relationship. The scale of this drawing is smaller than the scale of FIGS. 3 and 4.
Figure 9:
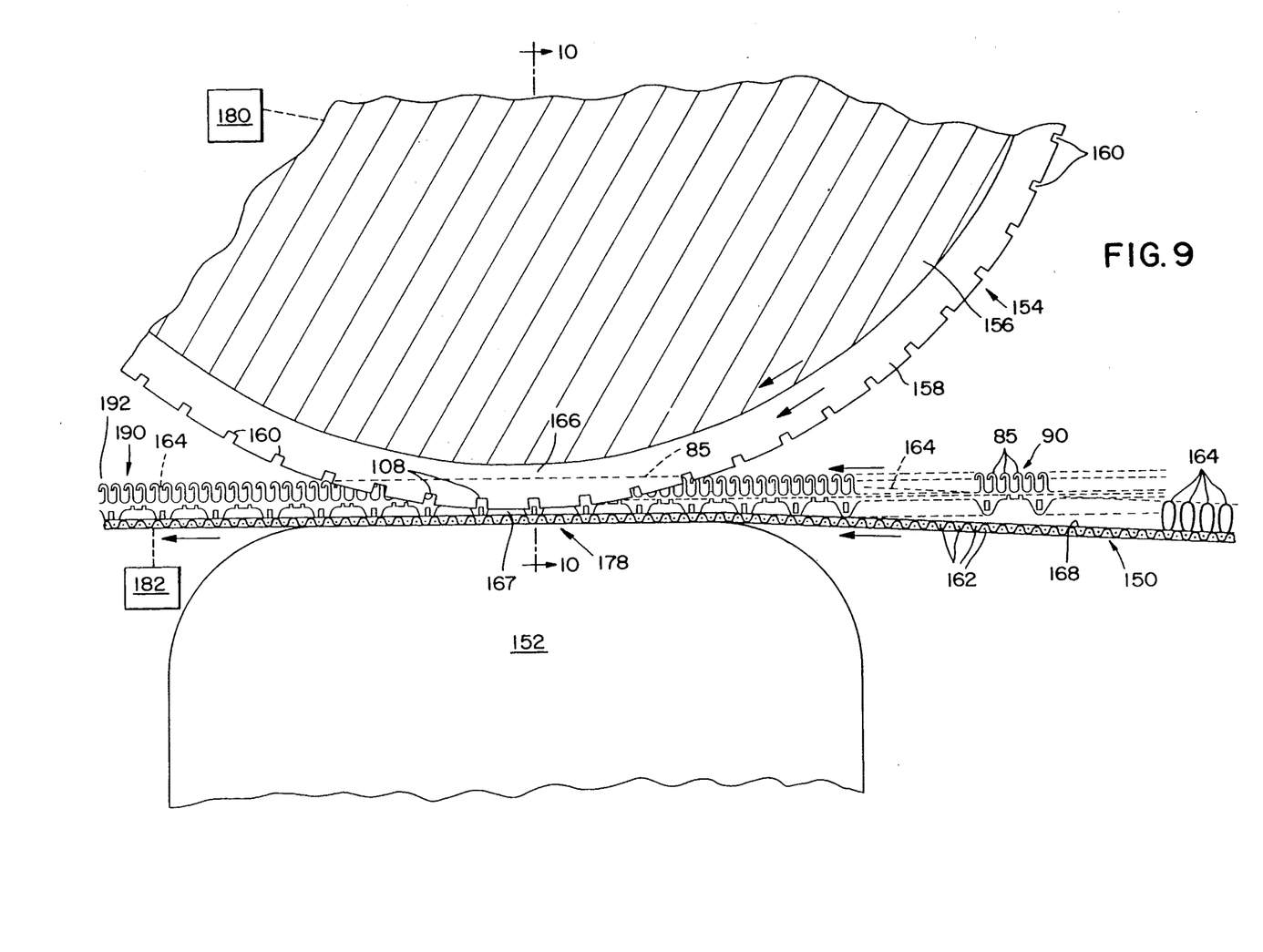
FIG. 9 is a side elevational view of a hook-ribbon in association with a rotary anvil and an ultrasonic welding tool pressing the welding projections of a hook-ribbon against a loop-bearing substrate and then bonding-/welding the tip portions of the projections with the loop-bearing substrate.

In FIG. 3 is shown a greatly enlarged side elevational view of a portion of one of the continuous thermoplastic hook-ribbons 90 dynamically molded in a mold cavity 80 (FIG. 2) by the method and system of FIGS. 1 and 2. FIG. 4 is a cross-sectional view taken along the stepped line 4—4 in FIG. 3. Along a top margin 84 of this hook-ribbon 90 is located a multitude of uniformly spaced hooks 85 having hook heads 86 and shanks 87. These hooks 85 are referred to herein as "J-shaped", and it is to be understood that this phrase "J-shaped hooks" is to be interpreted sufficiently broadly generically to include "inverted J-shaped hooks" 85, for example, as seen in FIG. 3 or FIG. 9 or hooks in any other orientation, for example, as seen in FIG. 5.

Along a bottom margin 92 of this hook-ribbon 90 is positioned a plurality of welding projections 94 which are uniformly spaced along the hook-ribbon 90. It is noted that this particular embodiment of the hook-ribbon includes four times as many hooks 85 per unit length of the hook-ribbon as welding projections 94. Each welding projection 94 as seen in side elevation in FIG. 3 is symmetrical about its centerline 96 and is positioned directly opposite a valley 88 between successive hooks 85. Each valley is symmetrical about the centerline 96. This hook-ribbon 90 includes a continuous median 100 or central continuous strip member extending longitudinally along the hook-ribbon and being located approximately mid-way between the tops of the hook heads 86 and the bottom tips 98 of the welding projections 94.

In order to provide flexibility for the hook-ribbon 90 in the plane of the elevational view as seen in FIG. 3 (and to control plastic flow in the mold as explained later), there is provided a pair of flexibility notches 102 located between the successive welding projections 94. These pairs of flexibility notches 102 are positioned directly opposite the shanks 87 of two successive hooks 85 along the top margin 84. It is note that the bottom margin 92 is symmetrical with respect to a centerline 104 located mid-way between successive centerlines 96. The length of this symmetrical region 106 of the bottom margin is indicated by the arrowed dimension "L". These symmetrical regions 106 are repeated at intervals equal to the longitudinal length occupied by four successive hooks 85 along the top margin. The leading and trailing edges of each welding projection 94 are sloped at 60 degrees relative to the longitudinal direction 107 of the hook-ribbon 90.

For providing driving surfaces for thrusting the welding projections 94 against a substrate, as will be explained later, there is a pair of bosses 108 (please see also FIG. 4). Each boss 108 is located directly opposite its twin, one on each face of each of the projections 94. This pair of bosses or shoulders 108 is integrally molded with the hook-ribbon 9 and is symmetrically positioned on each projection centerline 96.

It is noted that the root of each hook shank 87 is defined, stiffened and strengthened by rounded fairings 110 of radius "J", which blend into the top boundary of the median 100. The fairings 110 of successive hook shanks 87 exactly meet at the bottom of each valley 88, thereby defining valleys having semi-circular shape.

Various dimensions are indicated by way of an illustrative example:

EXAMPLE I

| Reference Letter | Dimension in Inches | Type of Dimension |
| --- | --- | --- |
| E | About 0.012 | Outer Radius of Hook Head |
| F | About 0.004 | Inner Radius of Hook Head |
| G | About 0.004 | Radius of Hook Tip |
| H | About 0.008 | Width of Hook Tip |
| I | About 0.008 | Width of Hook Recess |
| J | About 0.012 | Radius of Hook Valley Also: Radius of Fairing at Shank Root |
| K | About 0.024 | Width of Hook Valley |
| L | About 0.128 | Centerline to Centerline Distance Between Projections |
| M | About 0.008 | Width of Hook Shank |
| N | About 0.008 | Width of Flexibility Notch |
| O | About 0.015 | Width of Boss |
| P | About 0.012 | Depth of Flexibility Notch |
| Q | About 0.024 | Distance Between Two Notches |
| R | About 0.010 | Radius of Projection Tip |
| S | About 0.010 | Fairing Radius Where Projection Meets Median |
| T | About 0.004 | Radius of Flexibility Notch |
| U | About 0.004 to About 0.010 | Thickness of Hook-Ribbon |
| V | About 0.109 | Overall Height of Hook-Ribbon |
| W | About 0.032 | Height of Boss |
| X | About 0.010 | Thickness of Each Boss |
| Y | About 0.042 | Tip to Boss Top Distance |
| Z | About 0.010 | Tip to Boss Bottom Distance |
| D | About 0.015 | Valley Bottom to Boss Top Also: Valley Bottom to Lower Boundary of Median |
| A' | About 0.032 typical | Hook Repetition Distance |
| B' | About 0.024 typical | Width of Hook Head |
| C' | About 0.019 | Dependency of Hook Tip |

In this particular hook-ribbon 90, the stiffly flexible thermoplastic material 72 (FIG. 2) of which it is molded, is for example, Nylon polyamide (such as Nylon 6/6), or polypropylene.

In FIG. 5 are shown six identical mold bands A arranged in border-to-border closely spaced parallel relationship for defining five effectively continuous or endless mold cavities 80. Each mold cavity 80 serves to mold a hook-ribbon 90 (a portion of which is shown shaded) having features described above, and thus the borders of each respective mold band A-1 through A-6 have negative configurations relative to the corresponding margins of a hook-ribbon. As an example, it is noted that one border 112 of the mold band A-2 includes recesses 114 for molding the welding projections 94 on a hook-ribbon. There are also projections 116 on the border 112 for molding the flexibility notches 102 and for inhibiting premature plastic flow longitudinally along the continuous mold cavity 80. The other border 118 includes J-shaped recesses 120 for molding the hooks 85.

In order to facilitate the orientation of the hook ribbons when mounted onto a substrate, the J-shaped hook-molding cavities in the respective molds 80 face in alternate directions in successive molds. Thus, if the hook-ribbons are mounted onto a substrate in the same relative relationship as they are molded, the hooks will face in opposite directions in adjacent rows of hooks for providing a more uniform fastening action than would occur if all of the hooks were to face in the same direction. The mold bands A-1 through A-6 are identical, and the way in which successive rows of hooks are caused to face in opposite directions is to turn the alternate endless loop bands A-2, A-4 and A-6 inside out and end-for-end relative to the intervening bands A-1, A-3 and A-5.

As shown in FIG. 2, the injected melted thermoplastic material enters through inlet ports 82 into the continuous mold cavity 80. These inlet ports 82 (see also FIG. 7) are located in alignment with the center of each of the respective recesses 114 (FIG. 5) which mold the welding projections 94 (FIGS. 3 and 4). The projections 116, which mold the flexibility notches 102, advantageously tend to impede the longitudinal flow of the injected plastic material longitudinally along the continuous mold cavity 80. Thus, the injected plastic material is caused by these projections 116 to fill the J-shaped recesses 120 which mold the hooks 85.

For interlocking these six mold bands A-1 through A-6, while they are travelling through the injection region 28 between the mold-mating surface 78 and the support 24, each of these bands includes a rectangular opening 122. The use of these interlocking drive openings 122 will be explained later. Corners of these openings are rounded for stress relief and so that the working area of each opening is effectively an unimpeded, sharp-cornered rectangle. It is noted that the spacing D' between the borders 118 and 112 of nearby successive mold bands is about 0.015 of an inch for defining an endless mold cavity 80 between these borders. Also, the spacing E' between the centerlines 124 of two successive mold bands A is about 0.30 of an inch, with the interlocking drive openings 122 being centered on the respective centerlines 124. These openings 122 are spaced a center-to-center distance F' of about 0.256 of an inch along a band centerline 124, and it is noted that this distance F' is equal to the repeat distance of eight J-shaped hook molds 120 along a mold band A.

Figure 6:
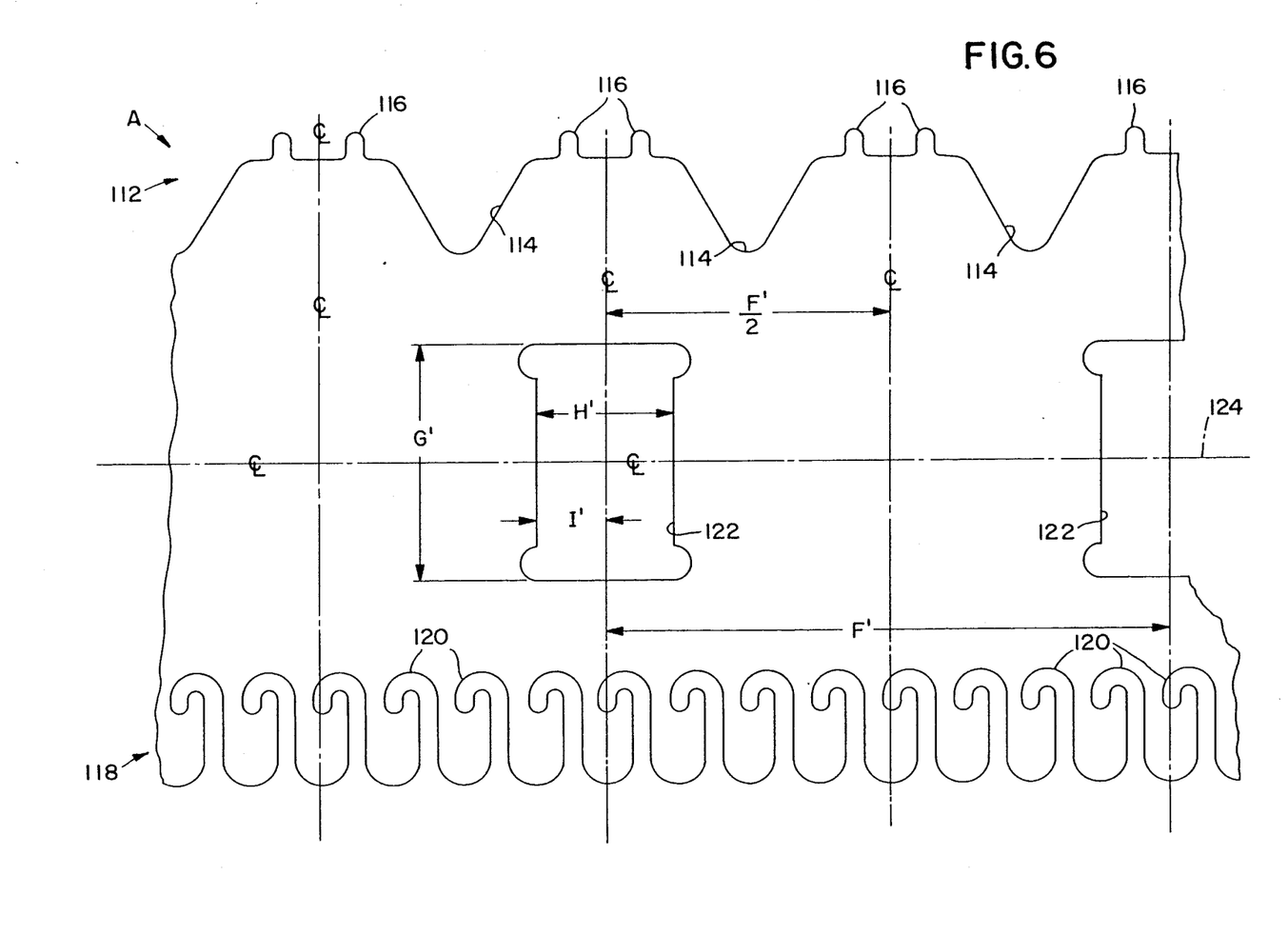
FIG. 6 is a plan view showing in greater detail one of the six mold bands as seen in FIG. 5 and each of which is referred to as mold band "A".

Turning attention to FIG. 6, there is shown a portion of one of the mold bands A of FIG. 5, drawn on a further enlarged scale for illustrating in greater detail its two borders 112 and 118 and the interlocking drive openings 122. The longitudinal centerline of this band A is shown at 124. A drive opening 122 has a length H' along this centerline 124 of about 0.062 of an inch, a half length I' of about 0.031 of an inch and a width G' of about 0.107 of an inch perpendicular to the centerline 124.

The border 112, which serves to mold the welding projections 94 (FIGS. 3 and 4) and the notches 102, repeats at intervals equal to F'/2, namely, a repetition distance of about 0.128 of an inch, equal to "L" in FIG. 3. The border 118 contains the J-shaped recesses 120 for molding the hooks 85 (FIG. 3).

Figure 7:
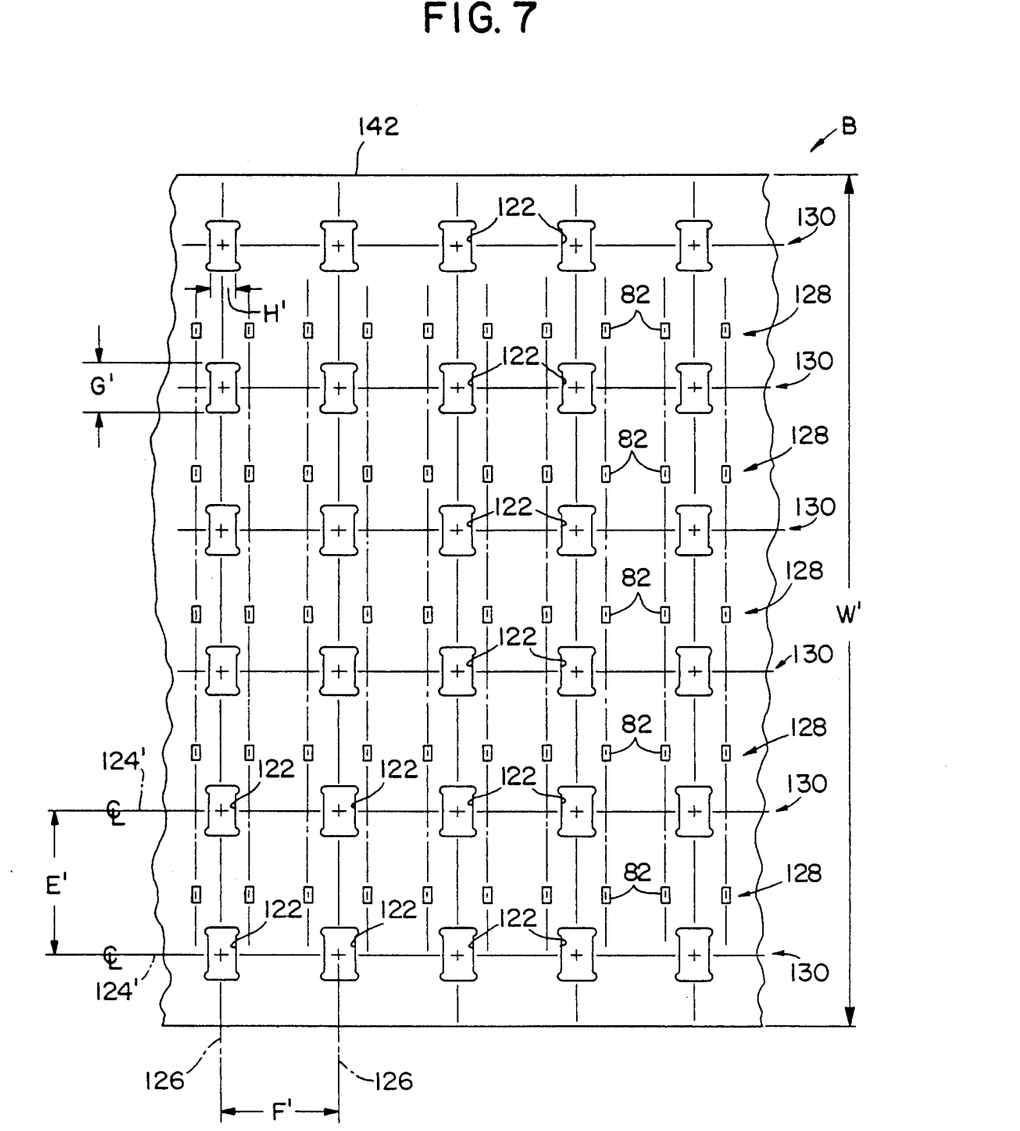
FIG. 7 is a plan view of another mold band considerably wider than those shown in FIGS. 5 and 6. This wider mold band is referred to as mold band "B". This band B spans all six of the mold bands seen in FIG. 5. There is one of these bands B positioned on top of the six bands A, and another of these bands B is positioned underneath the six bands A. In other words, the six bands A are sandwiched between the pair of bands B.

As shown in FIG. 7, a mold band "B" has a total width W' of about 1.797 inches, equal to the overall effective width span of the six parallel bands "A" in FIG. 5. This band B includes interlocking drive openings 122 identical in shape and spacing with the openings 122 in the bands A, as seen in FIGS. 5 and 6. The lateral spacing E' of these drive openings 122 in the lateral direction of the band B is indicated between longitudinally extending centerlines 124' in FIG. 7. The longitudinal spacing F' of these drive openings 122 is indicated between laterally extending centerlines 126.

In order to mold the bosses or shoulders 108, there are rectangular mold ports 82 in the upper and lower bands B (please also see FIG. 2) which communicate with the mold cavities 80 (FIG. 5) in the respective centers of the recesses 114 which serve to mold the welding projections 94. As explained previously, these mold ports 82 in the upper band B in FIG. 2 also serve to accommodate injection of the plastic material 72 into each of the five mold cavities 80. Thus, there are five rows 128 of these mold ports 82 in the band B for matching the five mold cavities 80, while there are six rows 130 of the interlocking drive openings 122 so as to match the corresponding openings 122 in the six mold bands A.

A portion of the lower mold band C is shown in plan view in FIG. 8. This band C has upstanding interlocking tabs 132 arranged in six rows 134 for engaging into the interlocking drive openings 122 in bands B and A. For clarity of illustration, the three upper rows 134 in FIG. 8 show the respective tabs 132 surrounded on three sides by broad U-shaped slots 136 in the first stage of manufacture, and the three lower rows 134 show the tabs 132 in their final upstanding positions, as shown enlarged in FIG. 8A. Thus, the tabs 132 in the upper three rows 134 are ready to be bent up, i.e. upset, into their intended final upstanding position, as shown in FIG. 8A. The width W' of this band C matches the width W' of the two bands B between which the six parallel bands A are sandwiched. The band C is symmetrical about its longitudinal centerline 138.

In assembling the layered bands B-A-B-C as seen in FIGS. 1 and 2, it is the edge 140 of the lowest band C which is oriented to be adjacent to the edge 142 (FIG. 7) of the lower band B which in turn is adjacent to the border 118 of the band A-6 (FIG. 5) which in turn is adjacent to the edge 142 (FIG. 7) of the uppermost band B. These edges 140, 142 and border 118 are at the right in FIG. 2, so that the sprocket wheel 26 (FIG. 1) can engage rear faces 145 (FIG. 8A) of the upstanding interlocking tabs 132 of the band C, to be explained.

As shown enlarged in FIG. 8A, an interlocking tab 132 extends to a height K' (for example, of about 0.058 to about 0.060 of an inch) above the top surface of the band C and is upset so that its front face 144 is perpendicular to the plane of band C. It is noted that the dimension F' (FIG. 8) is measured from this front face 144, which is the pitch for the teeth of the drive sprocket 26, and also for the interlocking drive openings 122 in bands A and B. As shown in FIG. 11, these interlocking tabs 132 project up through the aligned interlocking drive openings 122 in the two bands B with the bands A sandwiched therebetween. Thus, it will be appreciated from FIG. 11, that sprocket drive force applied to the rear face 145 of an interlocking drive tab 132 will serve to move all four bands simultaneously at the same speed.

In this illustrative embodiment, the band C is made, for example, of bendable spring steel or stainless steel having a thickness M' of about 0.010 of an inch. The bands A and B are each made, for example, from spring steel or stainless steel having respective thicknesses for producing the desired molded dimensions. Any burrs are removed from each of the bands.

FIG. 9 shows the method of making the hermaphrodite fastener (bi-functional fastener) using the hook-ribbons 90 in conjunction with a loop-bearing substrate 150. A hook-ribbon 90 is shown being bonded by ultrasonic welding to the loop-bearing substrate 150 by passing the substrate and parallel, spaced hook-ribbons (only one is seen) between an ultrasonically vibrated rigid tool member 152 and a rotary anvil 154. This rotary anvil comprises a solid hardened drive shaft 156 with radially extending driver rings 158 (only on is seen) keyed to this shaft. Also, there are spacers located between the respective driver rings 158, as will be explained in connection with FIG. 10, for providing clearance space for the hooks 85 to pass between the respective driver rings 158.

In order to engage snuggly, to receive, and to press down upon the bosses (shoulders) 108 (seen more clearly in FIGS. 3 and 4), there is a multiplicity of drive notches 160 located in the periphery of each driver ring. These drive notches 160 are uniformly circumferentially spaced around the perimeter of each driver ring; for example, there may be seventy-five of such drive notches uniformly circumferentially spaced 4.8 degrees around the axis of the drive shaft 156. For example, these notches 160 have a radial depth of 0.03 of an inch, namely, slightly less than the dimension "W" in FIG. 4.

The circumferential spacing between successive drive notches 160 matches the longitudinal pitch (longitudinal spacing) "L" (FIG. 3) between successive bosses 108 along a hook-ribbon 90. The ultrasonic vibration energy being transmitted via the tool member 152 causes the projections 94 to melt and become fused to the loop-bearing substrate 150. The tip portion 98 of each projection 94 contiguous with the substrate 150 is ultrasonically softened, melted and fused with the substrate material and melded into pores 162 of the substrate for anchoring the upstanding hook-ribbon.

There is a multiplicity of loops 164 on the upperside of the substrate 150. For clarity of illustration, the majority of loops 164 are omitted from FIG. 9, except at the right. For example, the loops 164 are schematically illustrated by a dashed line 164. Advantageously, the hook-ribbon 90, as seen in FIG. 4, is relatively narrow, and thus a very large proportion of the loops 164 extending up from the upper surface 168 of the substrate 150 remain undisturbed by the anchoring of such hook-ribbons to this substrate. In other words, this multiplicity of undisturbed loops remain available between the resulting rows of hooks for providing strong fastening attachment capability when mated with an opposed hook-bearing fastener.

It is to be understood that there is a clearance 166 between the tops of the hooks 85 and the shaft 156 for avoiding undesired ultrasonically-induced effects in the hooks. Also, there is a clearance 167 between the periphery of each driver ring 158 and the upper surface 168 of the loop-bearing substrate 150. The purpose of this clearance 167 is to allow the loops 164 to be temporarily bent over and deflected during passage beneath the driver rings 158 without becoming fused to the substrate 150, so that the loops spring back up to the original upright position after passing beneath the rotary anvil 154.

Figure 10:
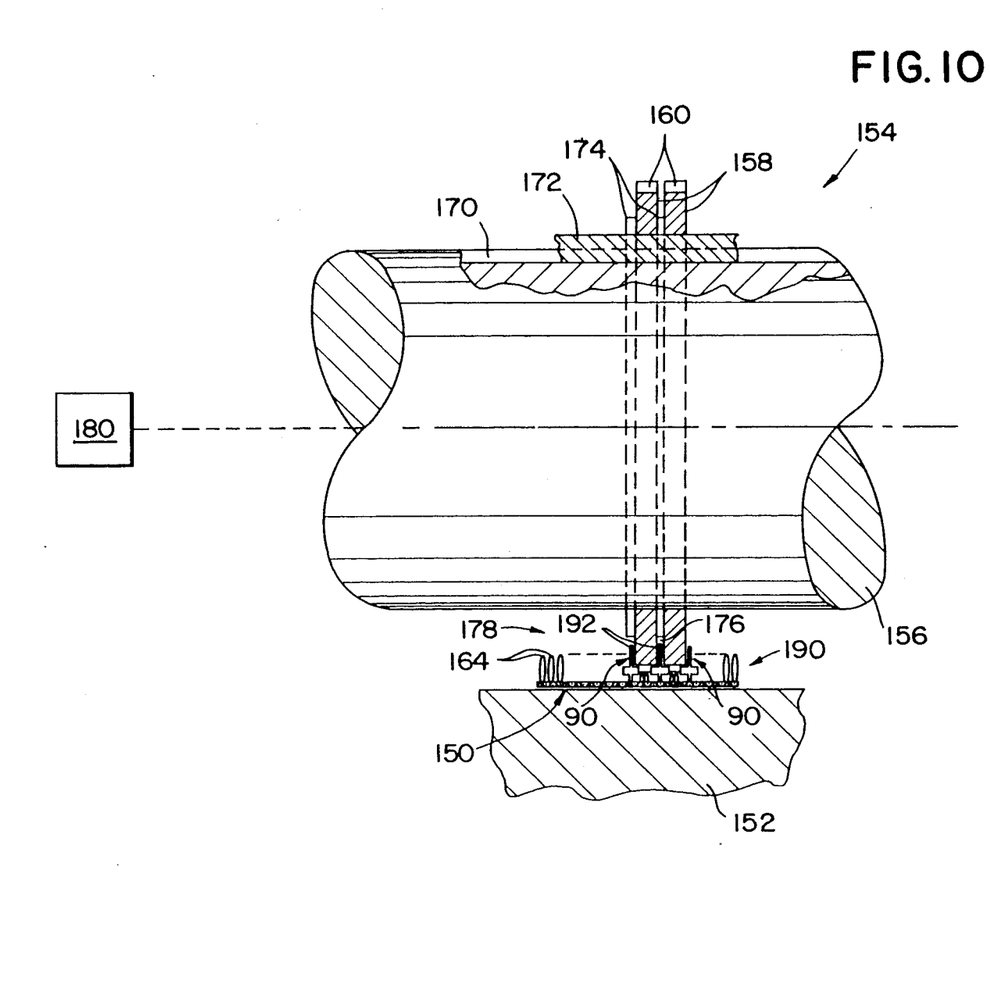
FIG. 10 is a front elevational and partial sectional view taken generally along the line 10—10 in FIG. 9 and showing the rotary anvil shaft plus two drivers and two spacers. These drivers engage the bosses on opposite surfaces of a hook-ribbon for thrusting the welding projections of the hook-ribbon against the substrate during bonding.

FIG. 10 is a front elevational and partial sectional view showing the rotary anvil 154 less enlarged than in FIG. 9. There is a keyway 170 with a key 172 for securing the driver rings 158 against rotation relative to the drive shaft 156. Between successive driver rings 158, there are spacer rings 174. The resulting space 176 between successive driver rings is sufficient to accommodate the hooks 85 and median portion 100 (FIG. 3) of a hook-ribbon 90. It is noted that the drive notches 160 of each driver ring engage the bosses 108 of two nearby hook-ribbons. Consequently, the lateral spacings between rows 192 of the hook-ribbons on an area of substrate 150 are readily changed by removing driver rings 158 from the shaft 156 to be replaced by thicker or thinner driver rings for respectively increasing or decreasing the lateral spacings between hook ribbons being mounted on the substrate 150. Also, for accommodating thicker hook-ribbons, i.e. those having a larger dimension "U" (FIG. 4), the spacer rings 174 are removed and replaced by thicker spacer rings and vice versa for thinner hook-ribbons.

The drive shaft 156 is rotated by drive means 180 for moving the hook-ribbon 90 through the hook-ribbon mounting anchoring station 178, defined between the rotary anvil 154 and the ultrasonic welding tool member 152. The loop-bearing substrate 150 is moved through this bonding station 178 by fabric drive means 182, for example, a roller having projecting pins engaging the substrate and being driven at the same effective rate as the rotary anvil drive means 180 for moving the substrate 150 and hook-ribbon 90 at the same speed through this station 178.

The loop-bearing area of substrate 150 may be a loop pile fabric (for example, a velvet fabric having uncut loop pile 164), or other loop-bearing fastener medium. The resulting hermaphrodite fastener 190 includes rows 192 of multiplicities of upstanding hooks 85 and multiplicities of loops 164, spread over the area of the substrate 150, between the rows 192 of hooks, as seen in FIGS. 9 and 10. Thus, a user has freedom of choice of various combinations of opposable matable fastener media, because this bi-functional fastener medium 190 can be mated with an opposed area of the same bi-functional fastener medium or can be mated with an opposed loop medium or with an opposed hook medium.

While the invention has been particularly shown and described with reference to preferred embodiments, it will be understood by those skilled in the art that various changes in form, details and dimensions may be made without departing from the spirit and scope of the invention, as defined by the appended claims and equivalents of the claimed elements.

We claim:

1. The method of making a multiple-hook fastener capable of hooking engagement with an opposed fastener area containing a multiplicity of loop-like openings into which the hooks can become engaged by bringing said multiple-hook fastener into contact with such an opposed fastener area, comprising the steps of:
    forming thermoplastic material into a plurality of hook-ribbons,
    each hook-ribbon having an upper margin and a lower margin,
    each upper margin having a multiplicity of hooks upstanding in a row along the margin,
    each lower margin having a plurality of downwardly projecting mounting projections, with the respective mounting projections being located at predetermined intervals along the lower margin, with a pair of shoulders being opposite sides of respective mounting projections,
    by defining a plurality of continuous mold cavities each having the shape of a hook-ribbon and continuously moving through an injection zone by providing a plurality of endless, flexible mold bands and by revolving said mold bands endwise and by bringing the revolving mold bands into layered relationship pressed together one on top of another in said injection zone,
    injection heated thermoplastic material in said injection zone into the continuously moving continuous mold cavities for shaping the injected heated thermoplastic material into the shapes of a plurality of hook-ribbons,
    cooling such shaped thermoplastic material for forming a plurality of hook-ribbons in the continuously moving plurality of mold cavities,
    separating the continuously moving mold bands from their layered relationship for opening the mold cavities, and
    removing the hook-ribbons from the separated continuously moving mold bands,
    providing an area of flexible substrate,
    feeding the substrate through a bonding station,
    positioning a plurality of hook ribbons in laterally spaced side-by-side relationship,
    feeding said plurality of hook-ribbons laterally spaced at predetermined spacing through the bonding station together with said substrate,
    orienting said hook-ribbons with their mounting projections facing toward the area of substrate in the bonding station and with their hooks upstanding away from the substrate,
    in said bonding station pushing pairs of opposed shoulders of the hook-ribbons toward said substrate for thrusting the mounting projections onto the substrate, and
    ultrasonically bonding said mounting projections to the substrate for producing the multiple-hook fastener having rows of hooks upstanding therefrom.

2. The method of making a multiple-hook fastener as claimed in claim 1, including the steps of:
    providing an area of flexible substrate having a multiplicity of loops upstanding from a loop-bearing upper surface thereof,
    orienting said loop-bearing upper surface of the substrate toward the mounting projections of the hook-ribbons in the bonding station with the hooks of the hook-ribbons upstanding away from said loop-bearing upper surface,
    in said bonding station pushing pairs of opposed shoulders of the hook-ribbons toward the loop-bearing upper surface for thrusting the mounting projections onto the loop-bearing upper surface of the substrate, and
    ultrasonically bonding said mounting projections to the loop-bearing upper surface of the substrate for producing a hermaphrodite multiple-hook fastener having rows of multiplicities of hooks upstanding among the loops on said loop-bearing upper surface of the substrate.

3. The method of making a multiple-hook fastener as claimed in claim 1, including the steps of:
    forming each upper margin of a hook-ribbon having hooks thereon all facing in a predetermined direction along the hook-ribbon,
    orienting said hook-ribbons in the bonding station with the hooks on a first plurality of hook-ribbons facing in a first direction and with the hooks on a second plurality of hook-ribbons facing in a second direction opposite to said first direction, and
    ultrasonically bonding the mounting projections of said first and second pluralities of hook ribbons to the substrate for producing the multiple-hook fastener having rows of hooks upstanding therefrom with a first plurality of said rows having hooks facing in a first direction and a second plurality of said rows having hooks facing in a second direction opposite to said first direction for enhancing engagement of said multiple-hook fastener with loop-like openings of an opposed fastener area.

4. The method of making a multiple-hook fastener as claimed in claim 3, including the steps of:
orienting said hook-ribbons in the bonding station with hooks on neighboring hook-ribbons facing in opposite directions, and
ultrasonically bonding the mounting projections of said hook-ribbons to the substrate for producing the multiple-hook fastener wit rows of hooks wherein the hooks in neighboring rows face in opposite directions.

5. The method of making a multiple-hook fastener as claimed in claim 1, including the steps of:
forming thermoplastic material simultaneously into a plurality of hook-ribbons arranged in spaced, parallel relationship,
forming each upper margin of each hook-ribbon with the hooks in the respective margin all facing in the same direction along the respective margin and wherein the hooks in successive hook-ribbons face in opposite directions,
orienting said hook ribbons in spaced parallel relationship in said bonding station with the hooks in successive hook-ribbons facing in opposite directions, and
ultrasonically bonding the mounting projections of said hook-ribbons to the substrate for producing the multiple hook fastener with spaced parallel rows of hooks with the hooks in successive rows facing in opposite directions for enhancing engagement of said multiple-hook fastener with loop-like openings of an opposed fastener area.

6. The method of making a multiple-hook fastener as claimed in claim 1, including the steps of:
forming each upper margin of a hook-ribbon having hooks thereon all facing in a predetermined direction along the hook-ribbon,
orienting said hook-ribbons in the bonding station with the hooks on a first plurality of hook-ribbons facing in a first direction and with the hooks on a second plurality of hook-ribbons facing in a second direction opposite to said first direction,
providing an area of flexible substrate having a multiplicity of loops upstanding from a loop-bearing upper surface thereof,
orienting said loop-bearing upper surface of the substrate toward the mounting projections of said first and second pluralities of hook-ribbons in the bonding station with the hooks of said first and second pluralities of hook-ribbons upstanding away from said loop-bearing upper surface,
in said bonding station pushing pairs of opposed shoulders of said first and second pluralities of hook-ribbons toward the loop-bearing upper surface of said substrate for thrusting the mounting projections of said first and second pluralities of hook-ribbons onto the loop-bearing upper surface of the substrate, and
ultrasonically bonding the mounting projections of said first and second pluralities of hook ribbons to the loop-bearing upper surface of the substrate for producing a hermaphrodite multiple-hook fastener having rows of hooks upstanding therefrom with a first plurality of said rows having hooks facing in a first direction among said loops and a second plurality of said rows having hooks facing in a second direction opposite to said first direction among said loops.

7. The method of making a multiple-hook fastener as claimed in claim 6, including the steps of:
orienting said hook-ribbons in the bonding station with hooks on neighboring hook-ribbons facing in opposite directions,
ultrasonically bonding the mounting projections of said hook-ribbons to the loop-bearing upper surface of the substrate for producing the multiple-hook fastener with rows of hooks wherein the hooks in neighboring rows face in opposite directions among the loops.

8. The method of making a multiple-hook fastener as claimed in claim 1, including the steps of:
forming thermoplastic material simultaneously into a plurality of hook-ribbons arranged in spaced, parallel relationship,
forming each upper margin of each hook-ribbon with the hooks in the respective margin all facing in the same direction along the respective margin and wherein the hooks in successive hook-ribbons face in opposite directions,
orienting said hook ribbons in spaced parallel relationship in said bonding station with the hooks in successive hook-ribbons facing in opposite directions,
providing an area of flexible substrate having a multiplicity of loops upstanding from a loop-bearing upper surface thereof,
orienting said loop-bearing upper surface of the substrate toward the mounting projections of the hook-ribbons in the bonding station with the hooks of the hook-ribbons upstanding away from said loop-bearing upper surface of said substrate,
in said bonding station pushing pairs of opposed shoulders of the hook-ribbon toward the loop-bearing upper surface of the substrate for thrusting the mounting projections of the hook-ribbons onto said loop-bearing upper surface, and
ultrasonically bonding said mounting projections to the loop-bearing upper surface of the substrate for producing a hermaphrodite multiple-hook fastener having rows of multiplicities of hooks upstanding among the loops on said loop-bearing upper surface of the substrate with the hooks in successive rows of hooks facing in opposite directions.

9. The method of making a multiple-hook fastener as claimed in claim 1, including the step of:
pushing on said pairs of shoulders for feeding said plurality of hook-ribbons laterally spaced through the bonding station together with said substrate.

10. The method of making a hermaphrodite multiple-hook fastener having rows of multiplicities of hooks upstanding among the loops on the loop-bearing upper surface of a substrate as claimed in claim 2, wherein:
said step of bonding said mounting projections to the loop-bearing upper surface of the substrate includes a transmission of ultrasonic vibrations to said projections for softening and melting them.

11. The method of making a multiple-hook fastener capable of hooking engagement with an opposed fastener area containing a multiplicity of loop-like openings into which the hooks can become engaged by bringing said multiple-hook fastener into contact with such an opposed fastener area, comprising the steps of:
forming thermoplastic material into a plurality of hook-ribbons, each hook-ribbon having an upper margin and a lower margin, each upper margin having a multiplicity of hooks upstanding in a row along the margin, with shoulders on opposite sides of each hook-ribbon, by defining a plurality of continuous mold cavities each having the shape of a hook-ribbon and continuously moving through an injection zone by providing a plurality of endless, flexible mold bands and by revolving said mold bands endwise and by bringing the revolving mold bands into layered relationship pressed together one on top of another in said injection zone, injection heated thermoplastic material in said injection zone into the continuously moving continuous mold cavities for shaping the injected heated thermoplastic material into the shapes of a plurality of hook-ribbons, cooling such shaped thermoplastic material for forming a plurality of hook-ribbons in the continuously moving plurality of mold cavities, separating the continuously moving mold bands from their layered relationship for opening the mold cavities, and removing the hook-ribbons from the separated continuously moving mold bands, providing an area of flexible substrate, feeding the substrate through a bonding station, positioning a plurality of hook ribbons in laterally spaced side-by-side relationship, feeding said plurality of hook-ribbons laterally spaced at predetermined spacing through the bonding station together with said substrate, orienting said hook-ribbons with their lower margins facing toward the area of substrate in the bonding station and with their hooks upstanding away from the substrate, in said bonding station pushing shoulders of the hook-ribbons toward said substrate for thrusting their lower margins onto the substrate, and ultrasonically bonding said lower margins to the substrate for producing the multiple-hook fastener having rows of hooks upstanding therefrom.

12. The method of making a multiple-hook fastener as claimed in claim 11, including the steps of:

providing an area of flexible substrate having a multiplicity of loops upstanding from a loop-bearing upper surface thereof, orienting said loop-bearing upper surface of the substrate toward the lower margins of the hook-ribbons in the bonding station with the hooks of the hook-ribbons upstanding away from said loop-bearing upper surface, in said bonding station pushing shoulders of the hook-ribbons toward the loop-bearing upper surface for thrusting their lower margins onto the loop-bearing upper surface of the substrate, and ultrasonically bonding said lower margins to the loop-bearing upper surface of the substrate for producing a hermaphrodite multiple-hook fastener having rows of multiplicities of hooks upstanding among the loops on said loop-bearing upper surface of the substrate.

13. The method of making a hermaphrodite multiple-hook fastener having rows of multiplicities of hooks upstanding among the loops on the loop-bearing upper surface of a substrate as claimed in claim 12, wherein:

said steps of bonding lower margins of hook-ribbons to the loop-bearing upper surface of the substrate includes a transmission of ultrasonic vibrations to said lower margins.

14. The method of making a multiple-hook fastener capable of hooking engagement with an opposed fastener area containing a multiplicity of loop-like openings into which the hooks can become engaged by bringing said multiple-hook fastener into contact with such an opposed fastener area, comprising the steps of:

forming thermoplastic material into a plurality of hook-ribbons, each hook-ribbon having an upper margin and a lower margin, each upper margin having a multiplicity of hooks upstanding in a row along the margin, each hook-ribbon having shoulders on opposite sides, said forming of said thermoplastic material being accomplished by:

defining a plurality of continuous mold cavities each having the shape of a hook-ribbon and continuously moving through an injection zone, injection heated thermoplastic material in said injection zone into the continuously moving plurality of continuous mold cavities for shaping the injected heated thermoplastic material into the shapes of a plurality of hook-ribbons, cooling such shaped thermoplastic material for forming a plurality of hook-ribbons in the continuously moving plurality of mold cavities, opening the continuously moving mold cavities and removing the hook-ribbons, providing an area of flexible substrate, feeding the substrate through a bonding station, positioning a plurality of hook ribbons in laterally spaced side-by-side relationship, feeding said plurality of hook ribbons laterally spaced at predetermined spacing through the bonding station together with said substrate, orienting said hook-ribbons with their lower margins facing toward the area of substrate in the bonding station and with their hooks upstanding away from the substrate, in said bonding station pushing shoulders of the hook-ribbons toward said substrate for thrusting their lower margins onto the substrate, and ultrasonically bonding said lower margins to the substrate for producing the multiple-hook fastener having rows of hooks upstanding therefrom.

15. The method of making a multiple-hook fastener as claimed in claim 14, wherein:

said area of flexible substrate has a plurality of loops upstanding from a loop-bearing surface, and said lower margins are ultrasonically bonded to said loop-bearing surface for producing a hermaphrodite fastener having both hooks and loops.

16. The method of making a multiple-hook fastener as claimed in claim 15, wherein:

said plurality of hook-ribbons feeding through said bonding station include hook-ribbons with hooks facing in a predetermined direction and other hook-ribbons with hooks facing in a direction opposite to said predetermined direction for producing said hermaphrodite fastener with hooks facing in opposite directions.

* * * * *